United States Patent [19]

Xu et al.

[11] Patent Number: 5,543,842
[45] Date of Patent: Aug. 6, 1996

[54] APPARATUS AND METHOD FOR PROVIDING MULTIPLE VIDEO DATA STREAMS FROM A SINGLE SOURCE

[75] Inventors: Frank Xu, Irving; Robert M. Nally, Plano, both of Tex.

[73] Assignee: Cirrus Logic, Inc., Fremont, Calif.

[21] Appl. No.: 474,262

[22] Filed: Jun. 7, 1995

Related U.S. Application Data

[62] Division of Ser. No. 152,182, Nov. 15, 1993, Pat. No. 5,455,626.
[51] Int. Cl.$^6$ ..................................................... H04N 7/08
[52] U.S. Cl. ........................ 348/387; 348/715; 348/385; 360/11.1
[58] Field of Search ................................... 348/715, 719, 348/720, 385, 387; 358/313; 360/11.1; H04N 5/92, 7/08

[56] References Cited

U.S. PATENT DOCUMENTS

| | | | |
|---|---|---|---|
| 4,704,629 | 11/1987 | Vreeswijk et al. | 348/387 |
| 4,774,599 | 9/1988 | Baumeister | 360/11.1 |
| 4,783,704 | 11/1988 | Funston | 360/11.1 |
| 5,193,000 | 3/1993 | Lipton et al. | 348/385 |

*Primary Examiner*—Safet Metjahic
*Assistant Examiner*—Jeffrey Murrell
*Attorney, Agent, or Firm*—Fulbright & Jaworski

[57] ABSTRACT

A method is provided for generating a composite video data stream. A first data stream composed of a sequence of frames of video data each having an x-dimension of a preselected number of pixels and a y-dimension of a preselected number of pixels is received. A second data stream composed of a sequence of frames of video data each having a x-dimension of a preselected number of pixels and a y-dimension of a preselected number of pixels is also received. The x- and y-dimensions of the frames of the first data stream are downscaled to produce a sequence of first blocks of pixels. The x- and y-dimensions of the frames of the second data stream are downscaled to produce a sequence of second blocks of pixels. The first blocks are written into a first object buffer associated with a first memory space during first and third ones of four processing phases using a set of counters associated with the first object buffer. The second blocks of data are stored in a second object buffer associated with a second memory space during first, second, third and fourth ones of the four processing phases using a set of counters associated with the second object buffer. A pair of blocks each composed of one of the first and one of the second blocks are retrieved out of a third object buffer associated with both the first and second memory spaces during ones of the first, second, third and fourth processing phases using a set of counters associated with the third object buffer. Each pair of blocks are then output as a field of the composite video data stream.

9 Claims, 4 Drawing Sheets

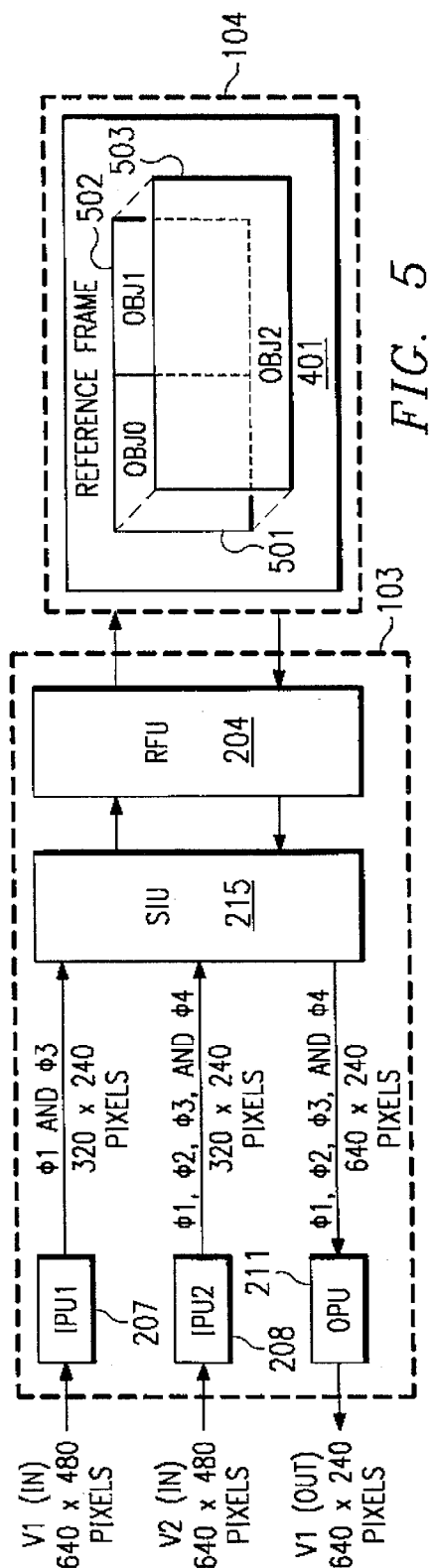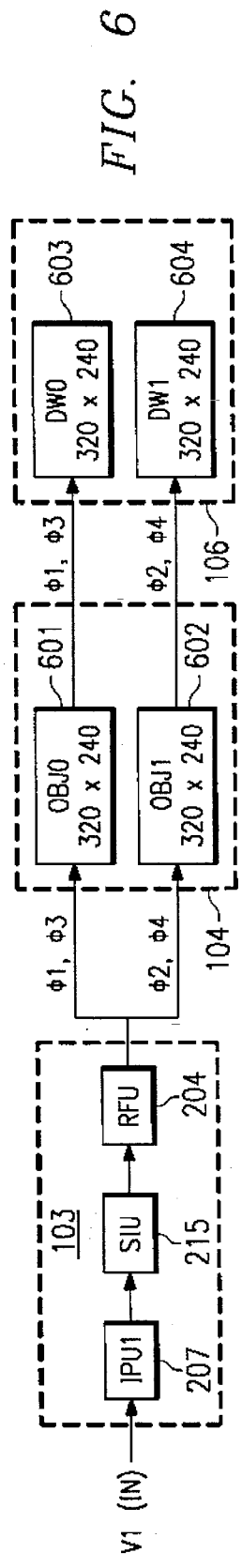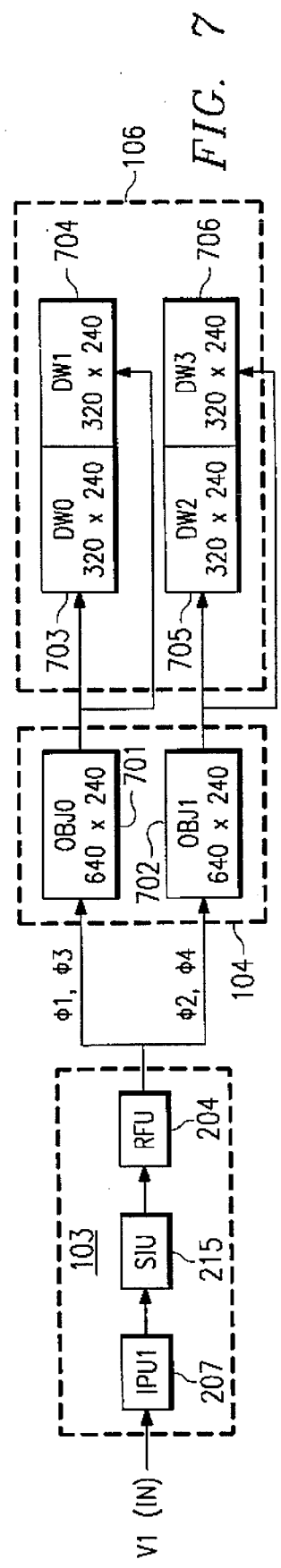

APPARATUS AND METHOD FOR PROVIDING MULTIPLE VIDEO DATA STREAMS FROM A SINGLE SOURCE

This is a division of application Ser. No. 08/152,182 filed Nov. 15, 1993 now U.S. Pat. No. 5,455,626 dated Oct. 3, 1995.

BACKGROUND OF THE INVENTION

Currently available video data sources are capable of only providing a single data stream representing a single sequence of video images (i.e., a movie or other video program). The most prevalent example of such a single data stream system is the VCR system. Presently, prerecorded VCR tapes carry only a single data stream such that only a single movie or other recorded program can be playbacked from the tape at a given time. In addition to the limitations on the prerecorded VCR tapes, limitations to the VCR record/playback units prevent both the simultaneous recording and playback of multiple video data streams. Currently available VCR recording systems are not capable of recording onto a single tape video data from two or more simultaneously received video data streams. Further, even assuming that two or more video data streams could be simultaneously recorded onto a single tape, currently available VCR playback systems are not capable of playing back such simultaneously recorded video data streams.

The ability to simultaneously record and playback multiple video data streams using a single tape has distinct advantages. For example, different sequences of video images could be simultaneously displayed in different areas (windows) of a single display screen using data provided by a single playback unit and a single tape. In the alternative, different sequences of video images could be provided from a single tape for simultaneous display on two or more different display screens. In particular, if multiple data streams could be simultaneously recorded on a single VCR tape, "double features" could be marketed wherein two or more movies or other video programming can be provided in a single tape cassette without a substantial increase in the length of the tape.

A similar problem exists in the cable television technology. Currently, only one video data stream is provided per channel which limits the number of programs available to a consumer at a given time to the number of available channels. Of course, additional channels could be made available to provide additional program choices but these additional channels would require additional frequency bandwidth which itself is limited in availability. If however, more than one video data streams (programs) could be provided per channel, the desired additional programming choices could be provided without a corresponding increase in frequency bandwidth.

Thus the need has arisen for apparatus, systems and methods for providing multiple video data streams from a single source.

SUMMARY OF THE INVENTION

According to one embodiment of the present invention, a method is provided for generating an output composite video data stream. During a first phase of a set of processing phases, a frame of first video data is received and then downscaled to produce a first block of data. Also during the first phase, the first block of data is stored and then retrieved from a first memory space. Each first block is upscaled and then output as a first field of the composite video stream. During a second phase of the set of processing phases a frame of second video data is received and downscaled to produce a second block of data. During the second phase, the second block is stored and then retrieved from a second memory space. The second block is then upscaled and then output as a second field of the composite video stream.

According to another embodiment of the present invention a second method of generating a composite video data stream is provided. During a selected phase of a set of processing phases, a first frame of video data is received and downscaled to produce a first block of video data. The first block is stored in a first memory space. During another of the processing phases a frame of second video data is received and downscaled to produce a second block of video data. The second block is stored in a second memory space. The first and second blocks are retrieved from the first and second memory spaces and output together as a field of the composite video data stream.

According to a further embodiment a video processing system is provided which includes a first video data source for generating a first stream of frames of video data, a second video data source for generating a second stream of frames of video data, a frame buffer, and a processor coupled to the first and second data sources and to the frame buffer. During a phase of a first set of phases, the processor is operable to receive a frame of the first video data, downscale the frame of first video data to produce a first block, store and retrieve the first block from a first memory space in the frame buffer, upscale the first block and then output the first block as a first field of a composite video stream. During a phase of a second set of phases, the processor is operable to receive a frame of the second video data from the second video data source, downscale the frame of the second video data to produce a second block of data, store and retrieve the second block from a second memory space in the frame buffer, upscale the second block, and then output the second block as a second field of the composite video data stream.

According to a further embodiment of the present invention, a video processing system is provided with a first video data source for generating a first stream of frames of video data, a second video data source for generating a second stream of frames of video data, a frame buffer and a processor. In this embodiment, the processor is operable during a phase of a first set of processing phases to receive a frame of the first video data, downscale such frame of first video data to produce a first block of video data, and store the first block in a first memory space. The processor is further operable during a phase of a second set of processing phases to receive a frame of the second video data, downscale such frame of second video data, said second block in a second memory space. Finally, during a phase of a third set of phases, the first and second blocks are retrieved from the first and second memory spaces and output together as a field of a composite video data stream.

The embodiments of the present invention provide substantial advantages over the prior art. One advantage of the embodiments of the present invention is that multiple video data streams may be generated and stored on a single recording media, such as a VCR tape. In this fashion, multiple video programming, such as "double features" may be provided from a single VCR tape or other media. The embodiments of the present invention also allow for a single video data source to provide video image data for the display of either multiple windows on a single display screen or on multiple independent screens. Additionally, the embodiments of the present invention can be used in instances such as cable t.v. to provide multiple data streams from a single transmission channel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a functional diagram illustrating the generation of the composite video data stream shown in FIG. 3c;

FIG. 6 is a functional diagram depicting the display of video data formatted as shown in FIG. 3b according to the principles of the present invention; and FIG. 7 is a functional diagram depicting the display of a composite video data stream formatted as shown in FIG. 3c according to the principles of the present invention.

DETAILED DESCRIPTION OF THE INVENTION

The principles of the present invention and their advantages are best understood by referring to the illustrated embodiment depicted in FIGS. 1–7 of the drawings, in which like numbers designate like parts.

Figure 1:
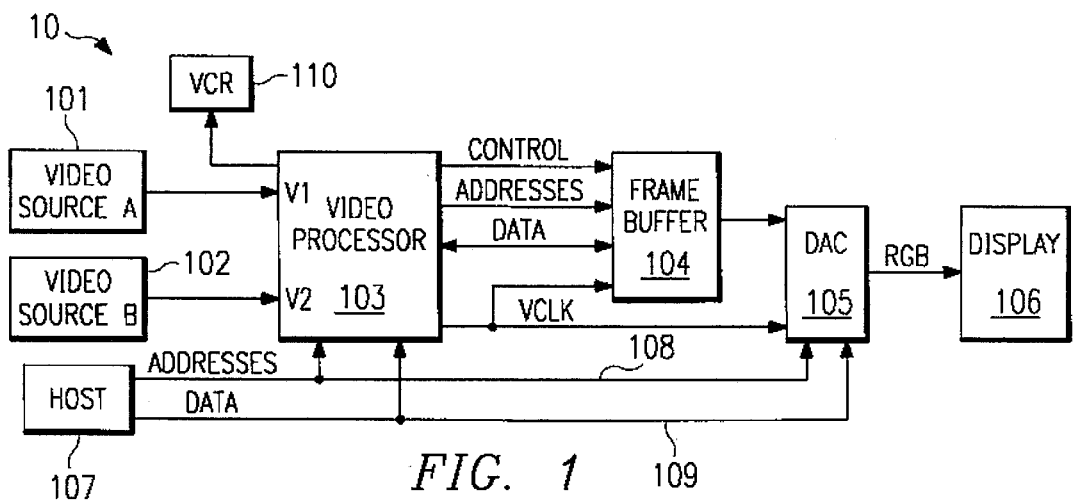
FIG. 1 is a functional block diagram of a video processing and display system embodying the principles of the present invention.

FIG. 1 is a functional block diagram of a video data processing system 10. Video data processing system 10 includes two video data sources 101 and 102, which each of which may be for example a VCR, video camera, cable television or similar video data source. System 10 also includes a video data processor 101 having at least a pair of input/output V1 and V2 ports for receiving NTSC data from video sources 101 and 102 respectively. Video processor 103 may be for example a Pixel Semiconductor CL-PX2070 digital video processor, a complete description of which may be found in "Preliminary Data Sheet CL-PX2070 Digital Video Processor," October 1992, available from Pixel Semiconductor, Dallas, Tex., such data sheet being incorporated herein by reference. The programming of the Pixel Semiconductor CL-PX2070 video processor is described in "Programmer's Reference Manual (Preliminary), Pixel Video Processing System," Stock No. 702099-001, October, 1993, also available from Pixel Semiconductor and incorporated herein by reference.

Video processor 103 operates in conjunction with a video memory or frame buffer 104. In the illustrated embodiment, video memory 104 consists of one or more random access memory devices (VRAMs). Video processor 103 provides frame buffer 104 with the requisite control signals, addresses, and a video clock to implement the exchange of video data between processor 103 and frame buffer 104 via the VRAM random ports and the output video data to digital-to-analog convertor 105 via the VRAM serial ports.

Multiple source, digital-to-analog converter (DAC) 105, which provides an interface with the system display unit 106. Digital-to-analog converter 105 may be for example a Pixel Semiconductor MediaDAC digital-to-analog converter, a complete description of which can be found in "Preliminary Data Sheet CL-PX2080 MediaDAC," December 1992, available from Pixel Semiconductor, Inc., Dallas, Tex., such data sheet being incorporated herein by reference. Display 106 in the illustrated embodiment is a conventional raster scan display. During data output to DAC 105, video data (in any one of a number of RGB or YUV formats) is transferred from the frame buffer 104 through the VRAM serial ports using the video clock (VCLK) provided by video processor 103. Digital-to-analog converter 105 in turn provides RGB color data defining the colors of images to be displayed on display 106.

System 10 is under the overall control of host processor 107 which is coupled to video processor 103 and DAC 105 by an address bus 108 and a data bus 109.

In the illustrated embodiment input/output port 101 is duplexed and further coupled to a video data recording/playback unit 110, such as a VCR as discussed further below, video data recording/playback unit is used to record and playback a composite video data stream generated from multiple video data streams received at input/output ports V1 and V2 from video sources 101 and 102.

Figure 2:
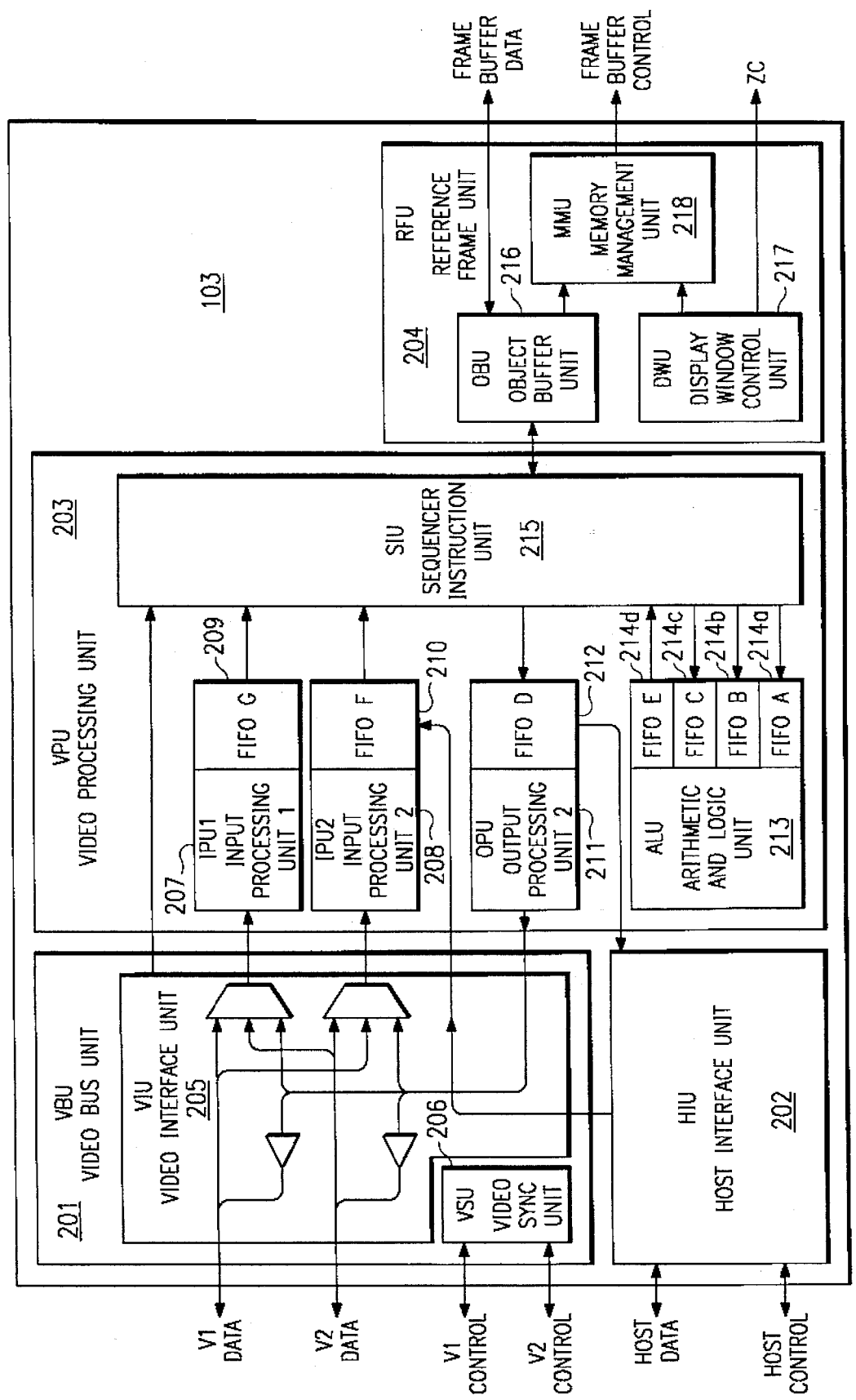
FIG. 2 is a detailed functional block diagram of the video processor shown in FIG. 1.

FIG. 2 is a detailed functional block diagram of video processor 103 in accordance with the preferred embodiment of the present invention in which video processor 103 is a Pixel Semiconductor CL-PX2070 video processor. The primary functional blocks of video processor 103 include a video bus unit 201, host interface unit 202, video processing unit 203 and reference frame unit 204.

Video bus unit 201 controls the flow of video data between video data sources 101 and 102 and video processor 103 through video ports V1 and V2. Video ports V1 and V2 of processor 103 can be configured as input ports only, output ports only, or pixel- or field-duplexed I/O ports. Video data ports V1 and V2 can input for example data in either a 16-bit 4:2:2 YCbCr, 12-bit 4:1:1 YCbCr, 16-bit RGB, or 8-bit RGB and output data as either 16-bit YCbCr, 16-bit RGB, or 8-bit RGB. Video bus unit 201 also includes a video interface unit (VIU) 205 which controls the flow of video data being exchanged through video ports V1 and V2. The video sync unit (VSU) provides identical, independent reference signals for each video port V1 and V2 including a vertical sync which specifies the beginning of a field or frame of pixels, a horizontal sync which specifies the beginning of a line of pixels, and a horizontal/composite blanking signal which specifies the horizontal/composite blanking interval.

Video processing unit 203 includes a pair of input processing units 207 and 208, each having an associated first-in/first-out memory (FIFO) 209 and 210, an output processing unit 211 with an associated FIFO 212, an arithmetic logic unit (ALU) with associated FIFOs 214*a–d*, and a sequencer instruction unit 215.

Input processor 207 provides for YCbCr and RGB input stream format conversion, color space conversion, programmable data tagging, three channel look-up table operations, horizontal prescaling, window clipping, horizontal and vertical scaling, and output stream format conversion. Second input processor (IPU2) 208 provides for prescaling and windowing. Output processing unit 211 provides zoom, window clipping, and output format functions.

Arithmetic logic unit 213 performs arithmetic, logical, and tagging operations on the input video data streams. Sequencer instruction unit 215 in the illustrated embodiment is a microcontroller which coordinates the flow of data between input processing units 207 and 208, output processing unit 211, arithmetic logic unit 213 and the object buffer unit 216 of reference frame unit 204.

Reference frame unit 204 includes object buffer unit 216, display window controller 217 and memory management unit 218. Object buffer unit 216 provides for object buffers to be locked to either of the video sources coupled to video inputs V1 and V2, or to be programmed to operate independently. These object buffers may also be placed anywhere within the linearly-addressable frame buffer 104. The object buffer unit 216 registers specify the size, location, operating mode, X and Y raster directions, FIFO association, chrominance and luminance channel masking, and output decimation for each object buffer. Display window unit 217 allows each display window to be of any size or location. Memory management unit 218 provides a frame buffer control interface to frame buffer 104.

Reference frame unit 204 is operable to create and manage one or more reference frames in frame buffer 104. Each reference frame is a rectangular two-dimensional region of the frame buffer 104 that can be allocated and de-allocated as required by a given software application. The reference frames can vary in size, order, location and can be continuous or separated. Within the reference frame object buffer unit (OBU) 216 can create one or more rectangular, two-dimensional storage regions or "object buffers" within a given reference frame. Each object buffer is associated with a set of counters which generate addresses for the purpose of moving data into and out of the corresponding object buffer. As data is passed from object buffer unit 216 to frame buffer 104, these counters increment or decrement the addresses to frame buffer 104 from the object origin to the object determination (determined by the object size) and then reset.

FIGS. 3*a–d* depict a small portion of example video data streams output by a single video data source, such as a single VCR playing back from a single tape, according to the principles of the present invention. As discussed further below, only two frames of two fields each are shown in FIGS. 3*a–d*, although in actual implementation these data streams are made up of a much larger number of frames/fields.

Figure 3A:
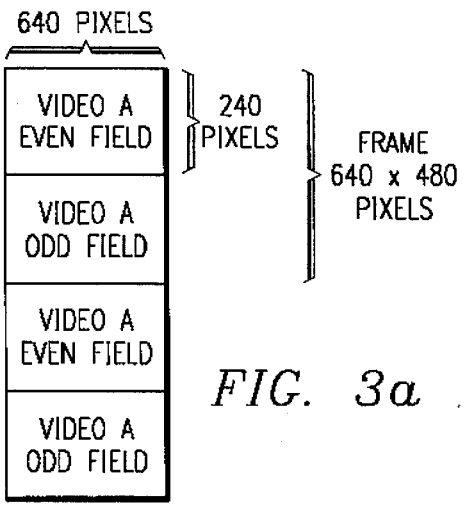
FIGS. 3a–d are a series of diagrams depicting example video data streams generated in accordance with the principles of the present invention.

In FIG. 3*a*, a single video data stream (video A) is being provided in a conventional manner as a sequence of 640 by 480 frames at a rate of 30 frames per second. Each frame is composed of an even field and an odd field, with each field dimensioned as 640 by 240 pixels.

Figure 3B:
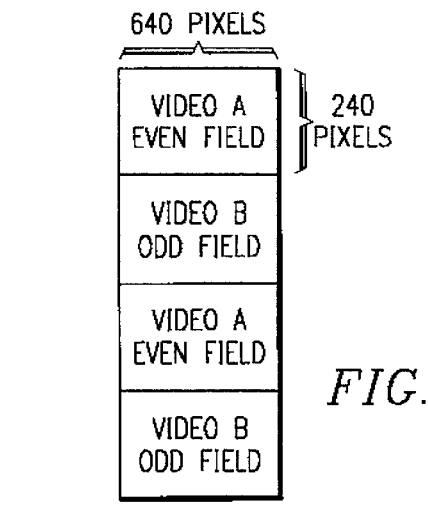

In FIG. 3*b*, two video data streams (video A and video B) are being output as a composite video data stream from a single data source according to a first embodiment of the present invention. In this case, the video A data stream is provided during the even field intervals and the video B data is provided during the odd field intervals. In FIG. 3*b*, each field is 640 pixels by 240 pixels with each frame (pair of odd/even fields) being transferred at a rate of 30 frames per second.

Figure 3C:
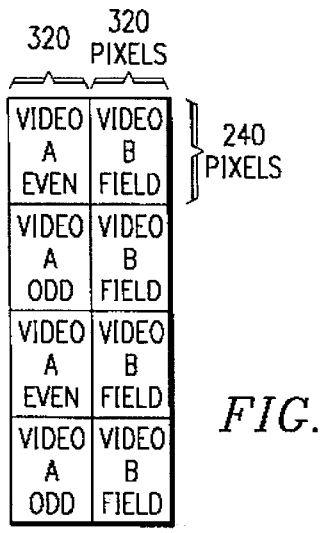

Referring next to FIG. 3*c*, a pair of video data streams (video A and video B) are again being provided as a composite video data stream by a single video data source according to a further embodiment of the present invention. In the embodiment depicted in FIG. 3*c*, each odd or even field of the composite data stream contains video data from each of the video A and video B; the lines of pixels of each field are divided in two such that a first 320 by 240 pixel block of the field represents video A data and a second 320 by 240 block of the field represents video B data.

Figure 3D:
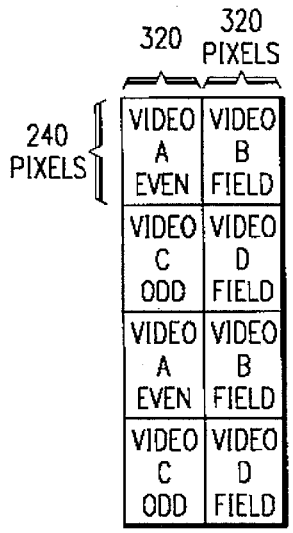

FIG. 3*d* depicts an additional embodiment of the present invention in which a single data source provides data representing four video streams (video A, video B, video C, and video D). In the embodiment illustrated in FIG. 3*d*, the even fields of the composite data stream are split into a pair of 320 by 240 blocks of pixel data representing video A and video B while the odd fields are split into a pair of 320 by 240 blocks of pixel data which correspond to video C and video D data.

Figure 4A:
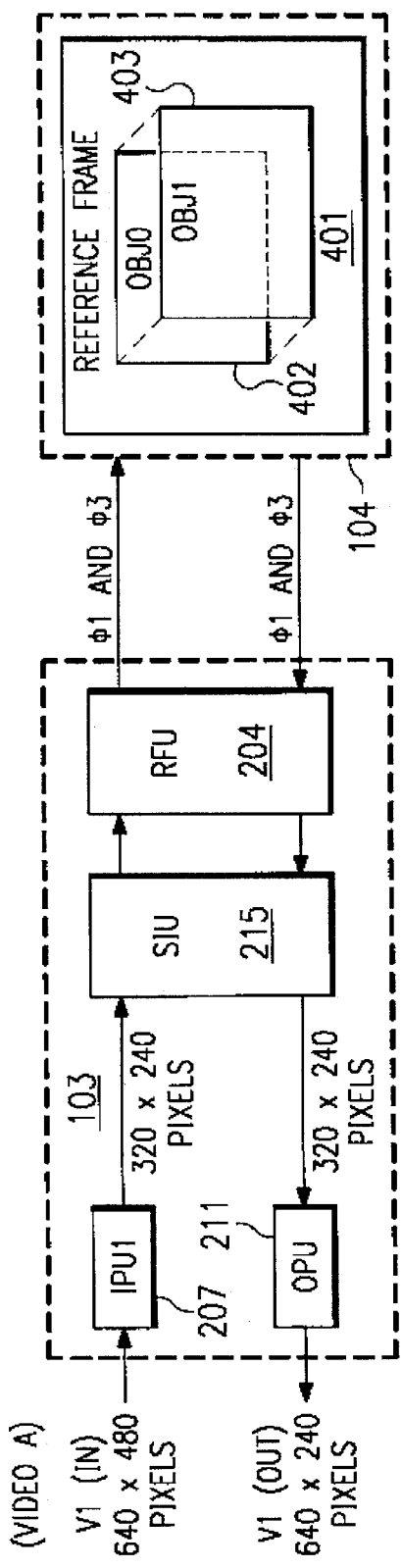
FIGS. 4a–b are functional diagrams illustrating the generation of the composite video data stream shown in FIG. 3b.
Figure 4B:
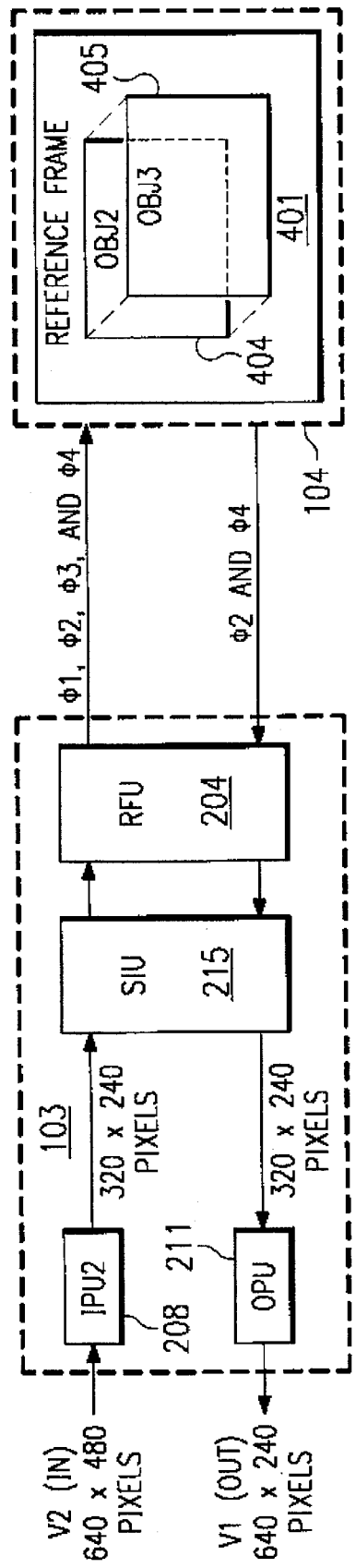

FIGS. 4*a* and 4*b* illustrate the generation of a composite video data stream such as that shown in FIG. 3*b*. More particularly, FIG. 4*a* depicts the processing of video data stream (video A) received at input V1 of processor 103 from video source 101 and FIG. 4*b* depicts the processing of the video data stream (video B) received at input V2 of processor 103 from video data source 102. It is important to note that while FIGS. 4*a* and 4*b* depict separately the processing of video A and video B, that processing in actuality is performed simultaneously as controlled by the phase processing discussed below.

In FIG. 4*a*, 640 by 480 pixel frames (one odd and one even field) are provided from video port V1 to input processor (IPU1) 207 at a rate of 30 frames per second. During each processing phase 1 and 3, a 640 by 480 frame of video A data is input and IPU 207 performs a by two scale down such that each 640 by 480 pixel frame received is reduced to 320 by 240 block of pixels. During the same processing phases 1 or 3, sequencer instruction unit 215 and reference frame unit 204 transfer the 320 by 240 block being processed from IPU 207 into object buffer 0 402 in reference frame 401 of frame buffer 104. This updates the existing video data in the object buffer 0 402. It should be recognized at this time that for purposes of the example embodiments discussed herein, the term "object buffer" or simply "object" describes a working space in frame buffer 104. Each object buffer is associated with one or more address counters for accessing that working space. For purposes of discussing the illustrated embodiments, it should be recognized that object buffers may occupy the same memory space of the frame buffer 104, may overlap, or may occupy completely separate memory spaces. The position of the object buffer 0 402 and the transfer of data into that buffer is controlled by the object 0 address counters in the object buffer unit 216 (FIG. 2).

In this embodiment, an object 1 buffer is also allocated to the same memory space in the reference frame 401 of frame buffer 104 and is controlled by the object 1 counters in the object buffer unit 216. In particular, the object 1 buffer 403 space in frame buffer 104 is identical in size and location to the object 0 buffer 402 space. During the current phase 1 or phase 3, the existing 320 by 240 block of pixels of object buffer 1 403 is read to the input of output processing unit 211 by the sequencer instruction unit 215 and the reference frame unit 204. The 320 by 240 pixel block of data transferred to output processor unit 212 is upscaled (doubled) in the X direction to provide a 640 by 240 field of pixels at the duplexed I/O port V1. This 640 by 240 field can then be recorded as an even field shown in FIG. 3b onto the tape of VCR 110 (FIG. 1).

The processing of the video B data received at data port V2 can now be described by reference to FIG. 4b. The video B data is received from video source 102 as 640 by 480 frames of pixels at a rate of 30 frames per second. During each processing phase 1, 2, 3, and 4 the frame input through port V2 is passed to input processor (IPU2) 208 (by inputting data on all four processing phases, video B data can be received asynchronous from video A). Input processor 208 down scales each 640 by 480 frame to a 320 by 240 block of pixel data. During the same phase, the 320 by 240 block of pixels is transferred by sequencer instruction unit 215 and a reference frame unit 216 into the object buffer 2 402 located in reference frame 401. The location and size of object buffer 2 is controlled by the object buffer 2 counters in object buffer unit 216 (FIG. 2). The identical memory space in frame buffer 104 is allocated to a second object, object 3 which is controlled by the object 3 counters in object buffer unit 216. While a block data is written into the object 2 object buffer on each of the four phases (phases 1, 2, 3 and 4), a block of data is written out of object buffer 3 405 during only phases 2 and 4.

Each block of pixel data read out of object 3 is then upscaled during the current phase 2 or 4 in the X direction by output processing unit 211 to a 640 by 240 block of data. The 640 by 240 blocks of pixels output during phases 2 and 4 become the odd fields shown in FIG. 3b. In sum, in accordance with the embodiment illustrated in FIG. 4, the composite video stream as shown in FIG. 3b is provided to VCR 110 for recording on a single videotape.

FIG. 5 illustrates the generation of the composite data stream shown in FIG. 3c from a pair of video sources (video A and video B) according to the principles of the present invention. In this embodiment, 640 by 480 pixel frames are received at I/O port V1 from video A data source 101 (FIG. 1) at a rate of 30 frames per second. A block of video data is input during each processing phases 1 and 3 and scaled down by input processing unit 207 to a 320 by 240 block of pixels. During current phase 1 or 3 the corresponding 320 by 240 block of video A pixels are transferred to the object buffer 0 501 in reference frame 401.

During phases 1, 2, 3, and 4 a 640 by 480 frame of pixels is input through I/O port V2. Input processing unit 208 scales down the 640 by 480 frames of video B data to 320 by 240 blocks of pixel data. During the current phases 1, 2, 3 or 4 the corresponding 320 by 240 block of video B pixel data is transferred to the object buffer 1 502. In this illustrative embodiment, object buffer 0 501 and object buffer 1 502, under the control of their associated address counters, are arranged side by side in the reference frame 401. A third object buffer, object buffer 2 503 is allotted the identical memory space as is allotted to both object buffer 0 501 and object buffer 1 502. Sequencer instruction unit 215 and reference frame unit 204 read out of the object buffer 2 503 using its corresponding counters. Data is read from object 2 buffer 503 as 640 by 240 blocks on each of phases 1, 2, 3 and 4. Output processor 211 then passes each 640 by 240 block of pixels through duplexed output port V1 as a composite frame (i.e., ½ frame composed of video A and ½ frame composed of video B as divided along each line of pixels). Data is output through port V1 at a rate of 30 frames per second.

Again, it is important to recognize that video A and video B data may not be synchronous when received at ports V1 and V2. For this reason, video A is input and processed during phases 1 and 3 while video B data is input and processed on phases 1, 2, 3, and 4. Further to prevent underflow out of output processing unit 211 object 2 is field locked by object buffer unit 216 to the video A vertical sync and additional dummy instructions are executed by sequencer instruction unit 104.

In accordance with the principles of the present invention, the composite video stream of FIG. 3d can be generated using a combination of the processing described in FIGS. 3 and 4. In this instance, the processing described in FIG. 5 is used to generate and record a pair of composite video data streams similar to that shown in FIG. 3c. In this case, one resulting video data stream is composed of video A and video B (taken from video sources 101 and 102) side by side in every odd and even field and the second resulting composite video stream generated and recorded is composed of video C and video D data (taken from video sources 101 and 102) arranged side by side similar to that shown in FIG. 3c with every odd and even field. Then, the two recorded video data streams generated in accordance with the processing shown in FIG. 4 can be used simultaneously as the two inputs to ports V1 and V2 as the data sources 101 and 102 for the processing shown in FIG. 4 to generate and record the final composite video data stream shown in FIG. 3d.

FIG. 6 illustrates one embodiment of the present invention for displaying video data A and video data B received in the composite format as shown in FIG. 3b. In this embodiment, input processing unit 1 207, SIU 215, and RFU 216 process the video A data received on each phase 1 and phase 3 using object buffer 0 601 in a frame buffer 104. On each phase 2 and 4 the video B data of the received composite data stream is processed using object buffer 1 602 in frame buffer 104. The video A data stored in object buffer 0 601 is used by video processor 103, through DAC 105 (not shown for clarity), to drive display window 0 603 on display 106 during each phase 1 and phase 3. The video B data in object buffer 1 602 is used by video processor 103, through DAC 105, to drive display window 1 604 on display 106. It is important to note that the principals of the present invention are not limited to the display of the video A and video B data as windows on a single screen. For example, the principals of the present invention also allow for the video A and video B data to be displayed on separate display screens either simultaneously or even at different times by selecting only one of video A or video B for display at a given time.

FIG. 7 depicts the read back of composite video streams similar to that found in FIG. 3c according to the principals of the present invention. On phases 1 and 3 the video A data received in each 640 by 480 frame and written into object buffer 0 701 as a 640 by 240 block. During phases 2 and 4 the video B portions of the fields of each 640 by 480 frame is written into object 1 buffer 702 as a 640 by 240 block. The contents of object buffer 0 701 are used to drive a pair of adjacent display windows 703 and 704 on display unit 106 during phases 3 and 4. The video B contents of object buffer 1 702 are written to adjacent display windows 705 and 706, also during phases 2 and 4.

The read back embodiment illustrated in FIG. 7 may also be used for the read back and display of composite video data streams such as that found in FIG. 3d.

Although the present invention and its advantages have been described in detail, it should be understood that various changes, substitutions and alterations can be made herein without departing from the spirit and scope of the invention as defined by the appended claims.

What is claimed is:

1. A method of generating a composite video data stream comprising the steps of:
   receiving a first data stream composed of a sequence of frames of video data each having an x-dimension of a preselected number of pixels and a y-dimension of a preselected number of pixels;
   receiving a second data stream composed of a sequence of frames of video data each having an x-dimension of a preselected number of pixels and a y-dimension of a preselected number of pixels;
   downscaling the x and y dimensions of the frames of the first data stream to produce a sequence of first blocks of pixels;
   downscaling the x and y dimensions of the frames of the second data stream to produce a sequence of first blocks of pixels;
   writing the first blocks into a first object buffer associated with a first memory space during first and third ones of four processing phases;
   storing the second blocks of data into a second object buffer associated with a second memory space during first, second, third and fourth ones of the four processing phases;
   retrieving a pair of blocks each composed of one of the first and one of the second blocks out of a third object buffer associated with both the first and second memory spaces during ones of the first, second, third and fourth processing phases; and
   outputting each pair of blocks as a field of the composite video data stream.

2. The method of claim 1 wherein data stream have an x-dimension of 640 pixels and a y-dimension of 480 pixels.

3. The method of claim 1 wherein the frames of the second video data stream have a said y-dimension of 640 pixels and a said y-dimension of 480 pixels.

4. The method of claim 1 wherein said step of downscaling the x and y dimensions of the frames of the first data stream comprises a step of reducing the selected pixels in the x and y dimensions by a factor two.

5. The method of claim 1 wherein said step of downscaling the x and y dimensions of the frames of the second data stream comprises a step of reducing the selected pixels in the x and y dimensions by a factor of two.

6. The method of claim 1 wherein said step of upscaling the x-dimension of each of the first blocks comprises a step of doubling the pixels in the x-dimension of each of the first blocks.

7. The method of claim 1 wherein said step of upscaling the x-dimension of each of the second blocks comprises a step of doubling the pixels in the x-dimension of each of the second blocks.

8. The method of claim 1 wherein at least one of said first and second video data streams comprises an input composite video data stream including data derived from a plurality of video data sources.

9. The method of claim 1 wherein the first field comprises an even pixel field and the second field comprises an odd pixel field.

* * * * *